(12) United States Patent
Celebiler

(10) Patent No.: US 6,195,094 B1
(45) Date of Patent: Feb. 27, 2001

(54) WINDOW SPLITTER BAR SYSTEM

(75) Inventor: Jonas Celebiler, Sunnyvale, CA (US)

(73) Assignee: Netscape Communications Corporation, Mountain View, CA (US)

( * ) Notice: Subject to any disclaimer, the term of this patent is extended or adjusted under 35 U.S.C. 154(b) by 0 days.

(21) Appl. No.: 09/163,070

(22) Filed: Sep. 29, 1998

(51) Int. Cl.$^7$ .................................................. G06F 3/00

(52) U.S. Cl. ......................... 345/339; 345/340; 345/342

(58) Field of Search .............................. 345/342, 339, 345/340

(56) References Cited

U.S. PATENT DOCUMENTS

| 5,680,562 | * | 10/1997 | Conrad et al. | 345/342 |
| 5,714,971 | * | 2/1998 | Shalit et al. | 345/340 |
| 5,771,042 | * | 6/1998 | Santos-Gomez | 345/342 |
| 6,008,809 | * | 12/1999 | Brooks | 345/342 |

* cited by examiner

Primary Examiner—Raymond J. Bayerl
Assistant Examiner—Sy D. Luu
(74) Attorney, Agent, or Firm—Michael A. Glenn

(57) ABSTRACT

A window splitter bar system in a computer environment provides a control button in the splitter bar between two panes in a multi-pane window application. The control button is used to open and close the pane. It is clicked to close the pane when the pane is open. The splitter bar stays visible when the pane is collapsed, appearing stuck next to the window's outer edge with the control button remaining visible. The control button is then clicked again to open the pane. The splitter bar can also be dragged in order to resize the pane, with the system storing the location of all of the splitter bars on the screen for restoring a closed pane back to its open state. The user can also drag the splitter bar to open and close the pane. When a pane is closed and the user drags an item over the splitter bar, the pane automatically expands so the user can drop the item into the pane. Once the item has been deposited in the pane, it automatically closes. This is enhanced with spring loaded folders where, not only does the pane itself open, but the hierarchy of a folder that the user wants to drop the item in expands. The user simply drags the item over the collapsed folder and presses the space bar or numerical keypad plus key to expand the folder, without needing to release the mouse button. If the folder is above or below the current view in the pane, the user simply points the item to the upper or lower border of the pane and the pane will automatically scroll up or down, respectively. A tool tip is displayed to the user when the user sets the preferences for whether automatic tool tips are displayed. When the mouse rolls over the button or splitter bar, and the user is not clicking on the button or anything else, the tool tip comes up to explain to the user what he can do with that area.

14 Claims, 4 Drawing Sheets

WINDOW SPLITTER BAR SYSTEM

BACKGROUND OF THE INVENTION

1. Technical Field

The invention relates to the display of windows for application programs in a computer environment. More particularly, the invention relates to the opening and closing of a pane in a multi-pane window application in a computer environment.

2. Description of the Prior Art

Computer application programs display multiple content screens to users by splitting a window of information into several panes. Each pane in a window is separated by a splitter bar which simply acts as a border between panes. Splitters come in different forms, each application controls the way a pane appears and disappears. Some applications allow the user to add, remove, or resize panes.

For example, referring to FIG. 1, spreadsheets such as Microsoft Excel, split the window 101 into panes 102a/102b. In the upper right corner above the scroll bar up arrow 103, there is a small horizontal bar 104 that the user points the mouse to. The user then presses the mouse button and the splitter bar appears as a thin, black horizontal line. The splitter can be dragged to create, delete, and enlarge or reduce the size of the two panes. When the user drags the splitter to the top or bottom of the window, the splitter and the second pane 102b disappear. However, the pane is not easily restored. The user must search through toolbars and menus to properly add the pane to the form and he must also re-enter all of the information that was in the pane before it was closed. Other spreadsheets have a similar mechanism.

Buttons residing on scroll bars and toolbars are also used. One approach has a button that resides on the lower scroll bar which the user clicks on to make the splitter bar and pane go away. It does not offer the user an intuitive indication that a pane has been closed or one can be reopened.

Another approach uses a toggle button that the user adds to the application's toolbar. The user presses the toggle button and a folder pane appears. When the user presses the button again, the folder pane disappears. However, the user cannot drag the splitter bar to close the pane and no button exists inside the pane that does this.

With respect to FIG. 2, some Internet browsers use a frame or pane that the user calls up by pressing a search button or several buttons on the toolbar that the user presses to call up a pane. There is a close box 202 in the top right corner of the frame 201 with an X in it that, when pressed, closes the frame. However, it completely closes the frame and the user has to know how to go back up to the main toolbar and press a button to get the pane back.

It would be advantageous to provide a window splitter bar system that intuitively gives the user the ability to open, close, and resize panes. It would further be advantageous to provide a window splitter bar system that utilizes the screen space on the splitter bar, thereby reducing the screen and toolbar real estate requirements which are at a premium.

SUMMARY OF THE INVENTION

The invention provides a window splitter bar system. The invention uses an intuitive and easily manipulated splitter bar system that allows a user to open, close, and resize a pane in a multi-pane application in a computer environment. In addition, the invention utilizes a splitter bar that efficiently uses the screen space required to indicate to the user that a pane can be closed or a closed pane exists.

A preferred embodiment of the invention provides a control button in the splitter bar between two panes. The control button is used to open and close the pane. The control button is clicked to close the pane when the pane is open. The splitter bar stays visible when the pane is collapsed, appearing stuck next to the window's outer edge with the control button remaining visible. This gives the user a reminder that a pane has been collapsed and provides an intuitive method to restore the pane. The control button is then clicked again to open the pane in the same manner that the user used to close the pane.

The splitter bar can also be dragged in order to resize the pane. The system stores the location of all of the splitter bars on the screen for restoring a closed pane back to its open state.

The user can also drag the splitter bar to open and close the pane. This allows users that are used to dragging items off windows to be consistent. The choice of dragging or clicking gives the user a good shot at figuring out how to operate the mechanism.

When a pane is closed and the user drags an item over the splitter bar, the pane automatically expands so the user can drop the item into the pane. Once the item has been deposited in the pane, it automatically closes. This is enhanced with spring loaded folders where, not only does the pane itself open, the hierarchy of a folder that the user wants to drop the item in expands. The user does not have to release the mouse button to open up several folders. The user simply drags the item over the collapsed folder and presses the space bar or numerical keypad plus key to expand the folder, without needing to release the mouse button. If the folder is above or below the current view in the pane, the user simply points the item to the upper or lower border of the pane and the pane will automatically scroll up or down, respectively.

A tool tip is also available. The user sets the preferences for whether automatic tool tips are displayed. When the mouse rolls over the button or splitter bar, and the user is not clicking on the button or anything else, the tool tip comes up to explain to the user what he can do with that area.

Other aspects and advantages of the invention will become apparent from the following detailed description in combination with the accompanying drawings, illustrating, by way of example, the principles of the invention.

DETAILED DESCRIPTION OF THE INVENTION

The invention is embodied in a window splitter bar system for computer applications. A system according to the invention provides an intuitive user interface for opening and closing a window pane in a multi-pane computer application, thereby enhancing the usable window workspace. Many existing application programs use approaches that make it difficult for the user to manipulate.

A preferred embodiment of the invention provides a control button in the splitter bar between two panes. The control button is used to open and close the pane. The control button is clicked to close the pane when the pane is open. The splitter bar stays visible when the pane is collapsed, appearing stuck next to the window's outer edge with the control button remaining visible. This gives the user a reminder that a pane has been collapsed and provides an intuitive method to restore the pane. The control button is then clicked again to open the pane in the same manner that the user used to close the pane. The splitter bar can also be dragged in order to resize the pane.

Figure 1:
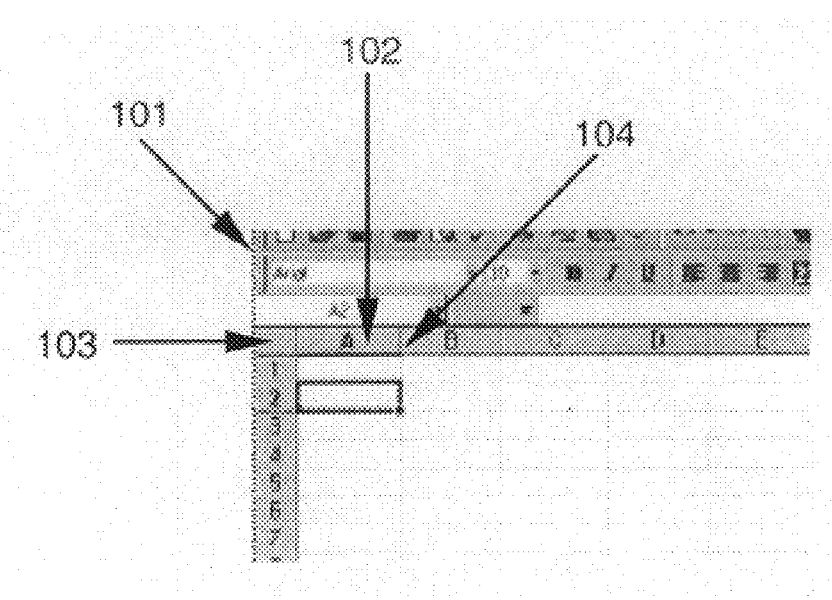
FIG. 1 is a schematic diagram of a Microsoft Excel spreadsheet according to the invention.
Figure 2:
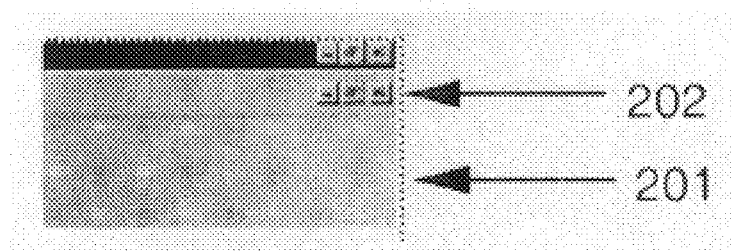
FIG. 2 is a schematic diagram of an upper right hand corner of a browser frame including a close box according to the invention.
Figure 3:
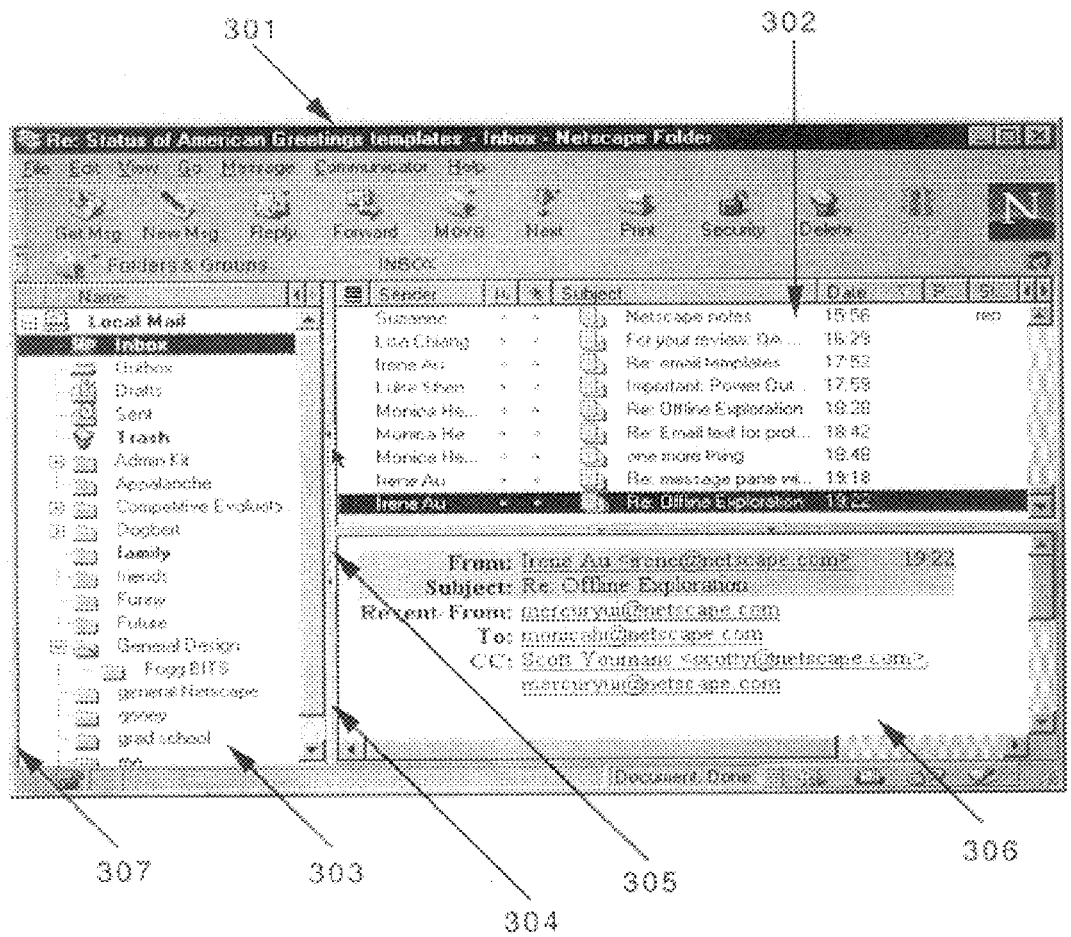
FIG. 3 is a schematic diagram of a three-pane window containing splitter bars with buttons according to the invention.
Figure 4:
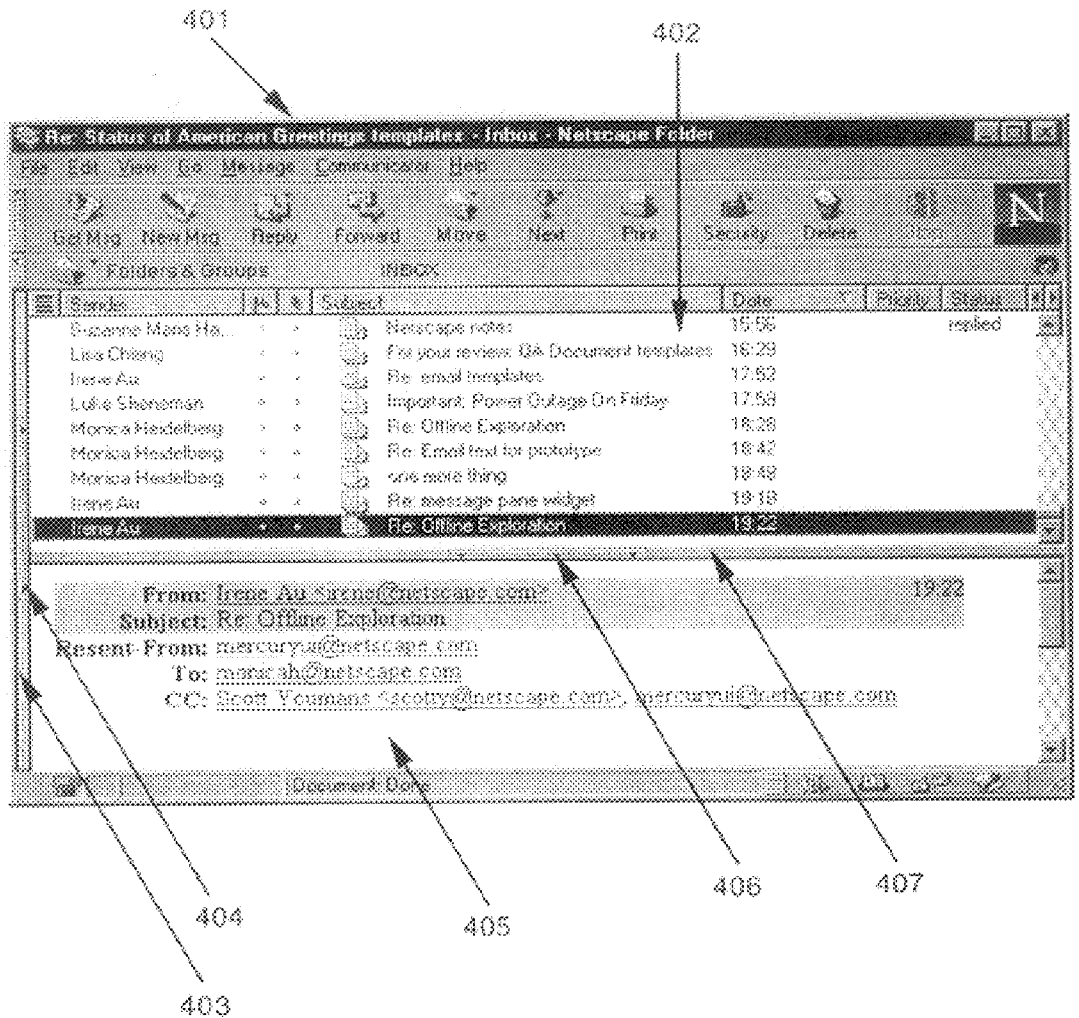
FIG. 4 is a schematic diagram of a three-pane window containing splitter bars with buttons and the left hand pane collapsed according to the invention.

Referring to FIGS. 3 and 4, using an example where a window is separated into three panes: a folder pane 303; a message list pane 302 and a specific message display pane 306. The invention allows the user to close and then open the folder pane 303. Most users find that having the folder pane 303 displayed is very useful, but it is not always desirable to have that pane take up space on the screen. Users want to gain screen space and yet be able to get at the folder pane 303 quickly.

The invention provides a splitter bar 304 between the folder pane 303 and the message list pane 302. A button 305 resides on the splitter bar 304. When the user moves the mouse over the button 305, it is highlighted to make it evident to the user that this is a new click. The splitter bar 304 can be dragged left or right, to change its position, or it can be dragged all the way to the left hand edge of the pane 307 to make the left hand pane disappear.

When the user drags the splitter bar 304 within a certain small area of the left hand pane 307, the action is interpreted as a snap to the left hand edge. If the user resized the pane and, for example, made the right side a little smaller, the position of the pane is saved as the stored position of the pane. The stored position is used for restoring a closed pane back to its open state.

The button 305 resides on the splitter bar 304 and is dragged from side to side as the user drags the splitter bar 304. If the user clicks once on the button 305, the splitter bar 304 snaps to the left hand edge 307 in one move. The folder pane 303 collapses to a zero-width pane. When the left hand pane is collapsed in this position, the splitter bar 403 remains visible as well as the button 404. The message list pane 402 and message display pane 405 expand to fill the area previously occupied by the folder pane 303. If the user clicks on the button 404 again, the splitter bar 403 will move back to its original position, restoring the folder pane 303, message list pane 302, and message display pane 306 back to their previous sizes.

The user can also drag the splitter bar 403 to open the pane. This allows users that are used to dragging items off windows to be consistent. The choice of dragging or clicking gives the user a good shot at figuring out how to operate the mechanism.

The button 305 on the splitter bar 304 allows the user to easily close a pane and then easily get it back and also enables the user to drag the splitter bar 304 to whatever size he wants and manipulate it however he wants. The invention is extremely useful for users that are not familiar with the complicated operations of a computer application.

With respect to FIG. 4, the splitter bar 407 can be horizontally or vertically situated. Here, the top pane is the message list pane 402 and the bottom pane is the message display pane 405. Users often want to collapse the message display pane 405 and just see a list of messages 402. The splitter bar 407 works in the same manner as described above. The user can simply click on the button 406 on the splitter bar 407, which separates the message list pane 402 from the message display pane 405 and it will close the message display pane 405, giving the user the whole window space to see the list of messages 402. Similarly, the user can get the message display pane 405 back by clicking the button 406 on the splitter bar 407, which will be at the bottom, and the message display pane 405 will pop back open.

Additionally, the splitter bar 407 may also have two buttons residing on it. One button for the lower pane and the other button for the upper pane. The two button splitter bar operates in the same manner as the single button splitter bar.

The user snaps the splitter bar up or down, closing the upper or lower pane. However, only one of the two panes can be closed at a time. The user can also drag the upper or lower pane open or closed. Resizing operates in exactly the same manner as the single button splitter bar.

One skilled in the art will readily appreciate that, although the horizontal and vertical orientation of the splitter bar is specifically mentioned, the orientation of the splitter bar does not matter, the functionality remains the same.

Additionally, the pane can be animated when it is opened so that it slides open when the button is pressed. Further, when the pane is closed, the splitter bar can be reduced such that the button is displayed by itself and overlapping whatever is underneath it, thereby reducing the screen space requirement.

When a pane is closed and the user drags an item over the splitter bar, the pane automatically expands so the user can drop the item into the pane. Once the item has been deposited in the pane, it automatically closes. This is enhanced with spring loaded folders where, not only does the pane itself open, the hierarchy of a folder that the user wants to drop the item in expands. The user simply drags the item over the collapsed folder and presses the space bar or numerical keypad plus key to expand the folder, without needing to release the mouse button. If the folder is above or below the current view in the pane, the user simply points the item to the upper or lower border of the pane and the pane will automatically scroll up or down, respectively. Having the pane open for the user allows him to perform the whole motion, the drag and drop, in one step without having to stop to open the pane and then stop to open the folders.

A tool tip is also available as an option. The user sets the preferences for whether automatic tool tips are displayed. When the mouse rolls over the button or splitter bar, and the user is not clicking on the button or anything else, the tool tip comes up to explain to the user what he can do with that area. For example, if the user can click on the button, drag the divider to collapse the pane, or click once on this area.

Figure 5:
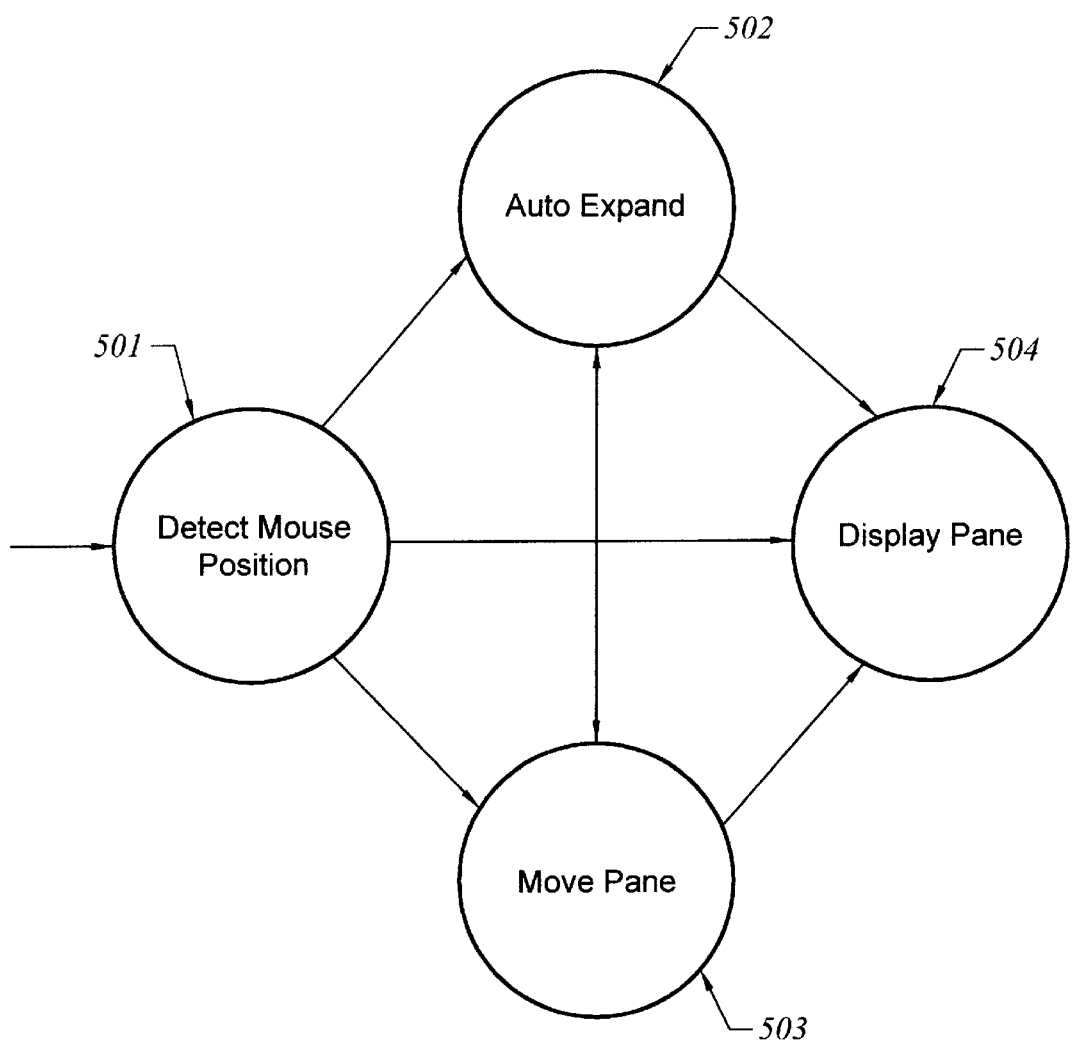
FIG. 5 is a block schematic diagram of a task-oriented view of a preferred embodiment of the invention according to the invention.

Referring to FIG. 5, the detect mouse position module 501 monitors the mouse for any positional information. The detect mouse position module 501 must pay attention to handling clicks of the mouse button. For example, it has to consider the case when the user moves the mouse after he has pressed the mouse button down to make the button and the splitter bar drag along. A button click is detected as a down and up click of the mouse button without dragging the button on the splitter bar. Any dragging past the edge of the window, resizing, or button push is indicated to the move pane module 503.

The move pane module 503 looks to see which button is clicked on the splitter bar (in the case of a multi-button splitter bar). There are two states when the user clicks on a button. If the splitter is in the middle of the window, clicking on the button means collapse, or if the pane is closed, then clicking on the button means restore. Dragging the splitter bar is also detected for opening, closing, or resizing a pane. The move pane module 503 remembers which state (i.e. open or closed) each pane is in. It also must remember the location of each splitter bar so the correct pane sizes and splitter bar positions are properly restored. Whenever a pane is repositioned, the move pane module 503 sends the display pane module 504 the new content to be displayed.

The auto expand module 502 tells the move pane module 503 to temporarily open the pane when an item is dragged over the splitter bar of a closed pane. It also expands folders when the item is dragged over a folder and automatically scrolls the pane when an item is dragged to the upper or lower edge of a pane.

The auto expand module 502 sends the display information to the display pane module 504.

Panes are displayed to the user through the display pane module 504. The display pane module 504 updates the screen display using data from the auto expand 502, move pane 503, and detect mouse position 501 modules. If the user hovers the mouse over a button on the splitter bar, the display pane module 504 highlights the button until the user moves the mouse away. Tool tips are also displayed when the user hovers the mouse over any components of the splitter bar for a predetermined amount of time and the tool tips preferences are set to display them.

Although the invention is described herein with reference to the preferred embodiment, one skilled in the art will readily appreciate that other applications may be substituted for those set forth herein without departing from the spirit and scope of the present invention. Accordingly, the invention should only be limited by the claims included below.

What is claimed is:

1. A process for controlling panes in a multi-pane window application in a computer environment, comprising the steps of:
   creating a button, said button is associated with a pane in said window;
   creating a splitter bar, said splitter bar is placed between two panes and at least one button resides on said splitter bar, said splitter bar having an open and closed position;
   detecting the user mouse position and mouse button click;
   moving said splitter bar to a desired position on said window when said splitter bar is in an open position and said mouse button is held over said splitter bar;
   storing the position of said splitter bar;
   updating said window to reflect new splitter bar positions;
   snapping said splitter to a closed position, thereby closing a pane when said splitter bar is in an open position and said button associated with said pane is clicked on with said mouse button; and
   snapping said splitter to an open position, thereby opening a pane when said splitter bar is in a closed position and said button associated with said pane is clicked on with said mouse button, said splitter bar is restored to said stored position.

2. The process of claim 1, further comprising the step of:
   highlighting said button when said mouse position is over said button.

3. The process of claim 1, further comprising the steps of:
   dragging said splitter to a closed position, thereby closing a pane when said splitter bar is in an open position and said mouse button is held over said splitter bar and is dragged in close proximity to the opposite edge of said pane; and
   dragging said splitter to an open position, thereby opening a pane when said splitter bar is in a closed position and said mouse button is held over said splitter bar and is dragged to a location on said window.

4. The process of claim 1, further comprising the steps of:
   automatically expanding a closed pane when an item is dragged over said splitter bar and said splitter bar is in a closed position; and
   snapping the splitter bar to a closed position wh en said item is dropped into said pane.

5. The process of claim 1, further comprising the step of:
   automatically expanding a folder in an open pane when an item is dragged over said folder and a selected key is pressed.

6. The process of claim 1, further comprising the step of:
   displaying a tool tip to the user according to the preferences set by said user when said mouse position is over said splitter bar or said button for a predetermined amount of time.

7. The process of claim 1, further comprising the step of:
   providing a first button and a second button residing on said splitter bar;
   wherein said snapping closed step snaps said splitter bar closed in a first direction when said splitter bar is in an open position and said first button is clicked on with said mouse button; and
   wherein said snapping closed step snaps said splitter bar closed in a second direction when said splitter bar is in an open position and said second button is clicked on with said mouse button, said second direction is opposite of said first direction.

8. An apparatus for controlling panes in a multi-pane window application in a computer environment, comprising:
   a button, said button is associated with a pane in said window;
   a splitter bar, said splitter bar is placed between two panes and at least one button resides on said splitter bar, said splitter bar having an open and closed position;
   a module for detecting the user mouse position and mouse button click;
   a module for moving said splitter bar to a desired position on said window when said splitter bar is in an open position and said mouse button is held over said splitter bar;
   a module for storing the position of said splitter bar;
   a module for updating said window to reflect new splitter bar positions;
   a module for snapping said splitter to a closed position, thereby closing a pane when said splitter bar is in an open position and said button associated with said pane is clicked on with said mouse button; and
   a module for snapping said splitter to an open position, thereby opening a pane when said splitter bar is in a closed position and said button associated with said pane is clicked on with said mouse button, said splitter bar is restored to said stored position.

9. The apparatus of claim 8, further comprising:
   a module for highlighting said button when said mouse position is over said button.

10. The apparatus of claim 8, further comprising:

a module for dragging said splitter to a closed position, thereby closing a pane when said splitter bar is in an open position and said mouse button is held over said splitter bar and is dragged in close proximity to the opposite edge of said pane; and a module for dragging said splitter to an open position, thereby opening a pane when said splitter bar is in a closed position and said mouse button is held over said splitter bar and is dragged to a location on said window.

11. The apparatus of claim 8, further comprising:

a module for automatically expanding a closed pane when an item is dragged over said splitter bar and said splitter bar is in a closed position; and a module for snapping the splitter bar to a closed position when said item is dropped into said pane.

12. The apparatus of claim 8, further comprising:

a module for automatically expanding a folder in an open pane when an item is dragged over said folder and a selected key is pressed.

13. The apparatus of claim 8, further comprising:

a module for displaying a tool tip to the user according to the preferences set by said user when said mouse position is over said splitter bar or said button for a predetermined amount of time.

14. The apparatus of claim 8, further comprising:

a first button and a second button residing on said splitter bar;

wherein said snapping closed step snaps said splitter bar closed in a first direction when said splitter bar is in an open position and said first button is clicked on with said mouse button; and wherein said snapping closed step snaps said splitter bar closed in a second direction when said splitter bar is in an open position and said second button is clicked on with said mouse button, said second direction is opposite of said first direction.

* * * * *